(12) United States Patent
McPherson et al.

(10) Patent No.: US 7,592,956 B2
(45) Date of Patent: Sep. 22, 2009

(54) WIRELESS TRANSMITTER LOCATION DETERMINING SYSTEM AND RELATED METHODS

(75) Inventors: Rodney Keith McPherson, Palm Bay, FL (US); David James Lanza, Indian Harbour Beach, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 12/029,689

(22) Filed: Feb. 12, 2008

(65) Prior Publication Data

US 2009/0201208 A1 Aug. 13, 2009

(51) Int. Cl.
G01S 3/02 (2006.01)
(52) U.S. Cl. .......................... 342/458; 342/457
(58) Field of Classification Search ............ 342/357.06, 342/442, 457, 458, 463–465; 455/456.1, 455/456.3, 457
See application file for complete search history.

(56) References Cited

U.S. PATENT DOCUMENTS

| | | | | |
|---|---|---|---|---|
| 5,343,212 A | * | 8/1994 | Rose et al. | 342/424 |
| 5,526,001 A | * | 6/1996 | Rose et al. | 342/442 |
| 5,719,584 A | | 2/1998 | Otto | 342/465 |
| 5,890,068 A | | 3/1999 | Fattouche et al. | 455/456 |
| 5,914,687 A | | 6/1999 | Rose | 342/442 |
| 5,974,039 A | | 10/1999 | Schilling | 370/335 |
| 6,054,950 A | | 4/2000 | Fontana | 342/463 |
| 6,233,459 B1 | | 5/2001 | Sullivan | 455/456 |
| 6,249,252 B1 | | 6/2001 | Dupray | 342/450 |
| 6,407,703 B1 | | 6/2002 | Minter et al. | 342/450 |
| 6,765,533 B2 | | 7/2004 | Szajnowski | 342/465 |
| 6,882,315 B2 | | 4/2005 | Richley et al. | 342/465 |
| 7,057,556 B2 | | 6/2006 | Hall et al. | 342/387 |
| 7,187,327 B2 | | 3/2007 | Coluzzi et al. | 342/458 |
| 7,203,497 B2 | | 4/2007 | Belcea | 455/446 |
| 7,203,500 B2 | | 4/2007 | Leeper et al. | 455/456.1 |
| 2003/0112183 A1 | | 6/2003 | Szajnowski | 342/465 |
| 2004/0029558 A1 | | 2/2004 | Liu | 455/414.3 |
| 2006/0087475 A1 | * | 4/2006 | Struckman | 342/451 |
| 2006/0267841 A1 | * | 11/2006 | Lee et al. | 342/463 |
| 2007/0247367 A1 | | 10/2007 | Anjum et al. | 342/464 |
| 2008/0161015 A1 | * | 7/2008 | Maloney et al. | 455/456.1 |

FOREIGN PATENT DOCUMENTS

| WO | 97/28456 | 8/1997 |
|---|---|---|
| WO | 2007/124300 | 11/2007 |

* cited by examiner

*Primary Examiner*—Dao L Phan
(74) *Attorney, Agent, or Firm*—Allen, Dyer, Doppelt, Milbrath & Gilchrist, P.A.

(57) ABSTRACT

A location determining system for a wireless transmitter is carried by a platform movable relative to the wireless transmitter. The location determining system may include an antenna, and a receiver coupled to the antenna. The location determining system may also include a location determining processor coupled to the receiver to collect, during movement relative to the wireless transmitter, a series of range measurements and a corresponding series of received signal measurements, and to estimate a location of the wireless transmitter based upon the range measurements weighted using the received signal measurements.

21 Claims, 10 Drawing Sheets

WIRELESS TRANSMITTER LOCATION DETERMINING SYSTEM AND RELATED METHODS

FIELD OF THE INVENTION

The present invention relates to the field of wireless transmission, and, more particularly, to a location determining system for a wireless transmitter and related methods.

BACKGROUND OF THE INVENTION

As cellular communication has become prevalent, it is not uncommon for a person to carry a cellular telephone device with them on a daily basis. Because of this, there is desire by local police and fire departments to use a corresponding cellular telephone device to help locate a missing person, for example, a person trapped in a collapsed building or a fugitive. Conventional approaches to cellular telephone device location include systems comprising a plurality of sensors. These systems typically use a triangulation method to determine the location of the cellular telephone device.

One approach to cellular telephone device location is disclosed by U.S. Pat. No. 6,407,703 to Minter et al. The system of Minter et al. includes a plurality of sensors situated in multiple locations/platforms. The system uses angle of arrival (AOA), time difference of arrival (TDOA), and terrain altitude information from signal intercepts from the cellular telephone device to determine the location thereof. The sensors use accurate time synchronization for determining the TDOA of the intercepted signals Another approach to locating a cellular telephone device is disclosed in U.S. Pat. No. 7,187,327 to Coluzzi et al. This system also includes a plurality of sensors using TDOA and time of arrival measurements of signals received from the cellular telephone device to determine the location thereof. The sensors in this system are also synchronized.

Another approach to locating a cellular telephone device is disclosed in U.S. Pat. No. 7,203,500 to Leeper et al. This system uses a wireless transceiver device to determine range to a companion wireless transceiver device, for example, the cellular telephone device, with signal propagation time measurements. Another approach to locating a cellular telephone device is disclosed in U.S. Pat. No. 7,057,556 to Hall et al. This system includes a plurality of sensors also using TDOA to determine the location of the cellular telephone device.

Another approach is disclosed in U.S. Pat. No. 5,719,584 to Otto, assigned to the present application's assignee, Harris Corporation of Melbourne, Fla. This system uses a plurality of ground based sensors to determine a location of the cellular telephone device by measuring TDOA and AOA values. This network of sensors is also synchronized.

An approach to locating a cellular telephone device within a high-rise structure is disclosed in U.S. Pat. No. 7,203,497 to Belcea. This system includes a plurality of sensors deployed throughout the structure that use signal propagation time measurements to determine the approximate location of the cellular telephone device within the structure.

The prior art systems for location of cellular telephone devices may suffer from several drawbacks. For example, these systems use multiple sensors that are synchronized for generation of TDOA measurements. The systems are also complex and expensive, and require multiple sensors on different platforms. The systems also provide inaccurate location data if the sensors are not properly deployed.

SUMMARY OF THE INVENTION

In view of the foregoing background, it is therefore an object of the present invention to provide a location determining system for a wireless transmitter that is accurate and less complex.

This and other objects, features, and advantages in accordance with the present invention are provided by a location determining system for a wireless transmitter, the location determining system to be carried by a platform movable relative to the wireless transmitter. The location determining system may include an antenna, and a receiver coupled to the antenna. The location determining system may also include a location determining processor coupled to the receiver to collect, during movement relative to the wireless transmitter, a series of range measurements and a corresponding series of received signal measurements, and to estimate a location of the wireless transmitter based upon the range measurements weighted using the received signal measurements. Advantageously, the location determining system is simpler and less costly to deploy.

For example, the received signal measurements may comprise at least one of bit-error rate measurements, received signal strength measurements, receiver metrics, and signal-to-noise ratio measurements. Additionally, the location determining processor may further estimate an elevation of the wireless transmitter. The location determining processor may estimate the location of the wireless transmitter based upon a least-squares steepest decent algorithm.

The location determining system may also comprise a platform position determining device. The location determining processor may cooperate with the platform position determining device so that the estimated location of the wireless transmitter comprises an estimated geolocation. The location determining processor may collect the series of range measurements using time of flight measurements.

In certain embodiments, the antenna may comprise a directional antenna. In these embodiments, the location determining processor may cooperate with the directional antenna to collect, during movement relative to the wireless transmitter, a corresponding series of angle of arrival measurements. The location determining processor may also estimate the location of the wireless transmitter further based upon the angle of arrival measurements. Furthermore, the location determining processor may weight the angle of arrival measurements based upon the received signal measurements. In some embodiments, the platform may comprise an aircraft. Alternatively, the platform may comprise a ground-based vehicle.

Moreover, the location determining processor may cooperate with the receiver to collect, during movement relative to the wireless transmitter, a corresponding series of received signal strength measurements. The location determining processor may further estimate the location of the wireless transmitter further based upon the received signal strength measurements weighted using the received signal measurements.

Another aspect is directed to a method of estimating a location of a wireless transmitter using a location determining system. The method may comprise collecting, during movement of the location determining system relative to the wireless transmitter, a series of range measurements and a corresponding series of received signal measurements. The method may also include estimating a location of the wireless transmitter based upon the range measurements weighted using the received signal measurements.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
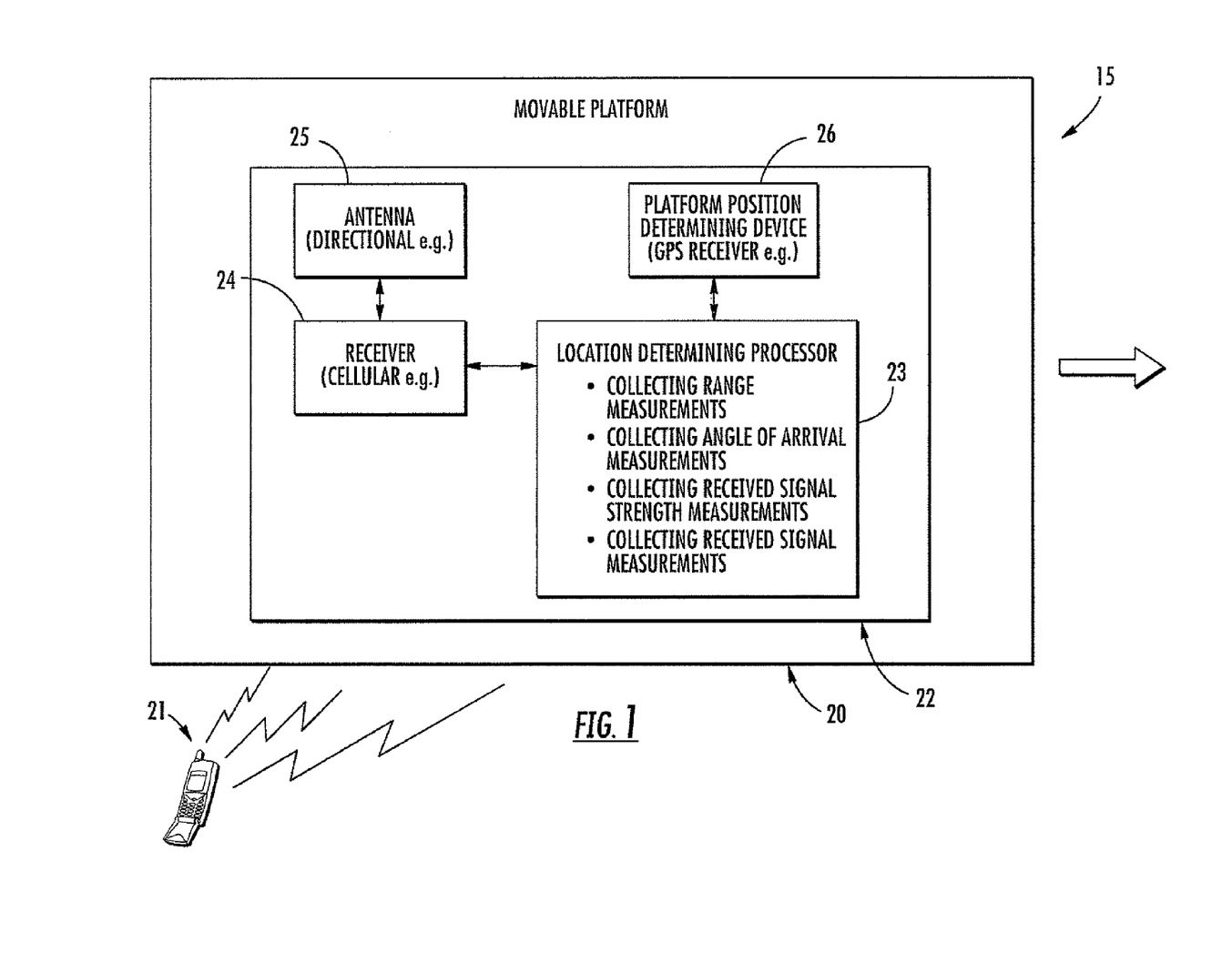
FIG. 1 is a schematic diagram of a location determining system, according to the present invention, being carried by a movable platform.

Referring initially to FIG. 1, a communication system 15 illustratively includes a location determining system 22 and a wireless transmitter 21. The location determining system 22 is illustratively carried by a platform 20 movable relative to the wireless transmitter 21. The platform 20 may comprise an airborne platform, for example, an aircraft, or alternatively a ground based vehicle platform, for example, an automobile. As will be appreciated by those skilled in the art, the effective range of the location determining system 22 may increase in embodiments including the airborne platform.

The wireless transmitter 21 illustratively comprises a cellular telephone. The receiver 24 may comprise a receiver compatible with the cellular telephone. As will be appreciated by those skilled in the art, the cellular telephone may be compatible with the Global System for Mobile communications (GSM) standard, the code division multiple access (CDMA) standard, the IS-95 standard, the CDMA2000 standard, or the UMTS mobile telephone standard.

The location determining system 22 illustratively includes an antenna 25, and a receiver 24 coupled to the antenna. The location determining system 22 illustratively includes a location determining processor 23 coupled to the receiver 24 to collect, during movement relative to the wireless transmitter 21, a series of range measurements and a corresponding series of received signal measurements, and to estimate a location of the wireless transmitter based upon the range measurements weighted using the received signal measurements. For example, the range measurements may comprise time of flight measurements, i.e. the time elapsed for a transmission signal to traverse the distance between the platform 20 and the wireless transmitter 21. Advantageously, the location determining system 22 includes a single sensor/antenna 25 for determining the location of the wireless transmitter 21. Accordingly, no synchronization or alignment of the sensors may be needed in some embodiments.

The received signal measurements may comprise, for example, at least one of bit-error rate measurements, received signal strength measurements, receiver metrics (i.e. Viterbi path metrics), and signal-to-noise ratio measurements. In other words, the received signal measurements relate directly to the quality of the signal being received by the location determining system 22.

Figure 6:
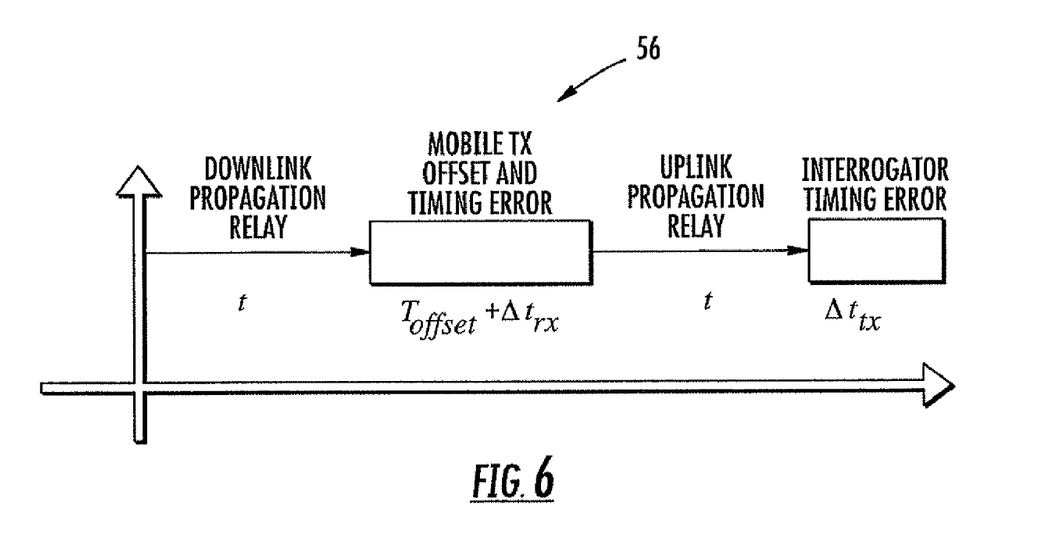
FIG. 6 is a chart illustrating the process for establishing frame boundaries with a wireless transmitter in the location determining system, according to the present invention.

Referring briefly to FIG. 6, the time of flight measurements may be based upon the following equation.

$$\underset{Estimated}{T_{elapse}} = 2t_0 + \underset{known}{T_{offset}} + \overset{Error\ Terms}{\underset{Bound}{\Delta t_{rx}} + \underset{Bound}{\Delta t_{tx}}}$$

The distance between the wireless transmitter 21 and the platform 20 may be provided by the following equation.

$$\hat{d} = c\left[\frac{T_{elapse} - T_{offset}}{2}\right] = d + c\left[\frac{\Delta t_{rx} + \Delta t_{tx}}{2}\right]$$

More specifically, and as depicted in the diagram 56 of FIG. 6, the antenna 25 may transmit a signal to be received by the wireless transmitter 21. As will be appreciated by those skilled in the art, the signal may comprise a signal that would routinely prompt a transmission reply from the wireless transmitter 21 under the applicable communication standard. Once the wireless transmitter 21 receives the signal from the location determining system 22, the wireless transmitter transmits a reply signal that is received by the platform 20. As will be appreciated by those skilled in the art, the location determining system 22 may compensate for the mobile transmitter 21 transmission delay, i.e. processing lag ($T_{offset}$) before transmission of a reply signal to the platform 20. In some embodiments, the receiver 24 may comprise a transceiver for transmitting the signal to the wireless transmitter 21.

In other embodiments, the time of flight measurements may be generated using a time of transmission stamp within the reply signal by differing the reply signal receipt time with the indicated time of transmission. As will be appreciated by those skilled in the art, the platform 20 and the wireless transmitter 21 may be time synced via satellite, for example, the Global Positioning System.

In certain embodiments, the antenna 25 may comprise a directional antenna, for example, a switched beam antenna. In these embodiments, the location determining processor 23 cooperates with the directional antenna to collect, during movement relative to the wireless transmitter 21, a corresponding series of angle of arrival measurements. The location determining processor 23 estimates the location of the wireless transmitter 21 further based upon the angle of arrival measurements. Furthermore, the location determining processor 23 weights the angle of arrival measurements based upon the received signal measurements, for example, at least one of bit-error rate measurements, received signal strength measurements, receiver metrics, and signal-to-noise ratio measurements.

In other embodiments, the location determining processor 23 may cooperate with the receiver 24 to collect, during movement relative to the wireless transmitter 21, a corresponding series of received signal strength measurements. The location determining processor 23 may estimate the location of the wireless transmitter 21 further based upon the received signal strength measurements weighted using the received signal measurements, for example, at least one of bit-error rate measurements, received signal strength measurements, receiver metrics, and signal-to-noise ratio measurements. The location determining processor 23 may use the received signal strength measurements for breaking the symmetry, ambiguity resolution, etc. In other words, the location determining processor 23 may weight the received signal strength measurements based upon the bit-error rate, for example. In alternative embodiments, the weighting of the received signal strength measurements may also comprise, for example, a unity factor (no weighting).

Figure 8:
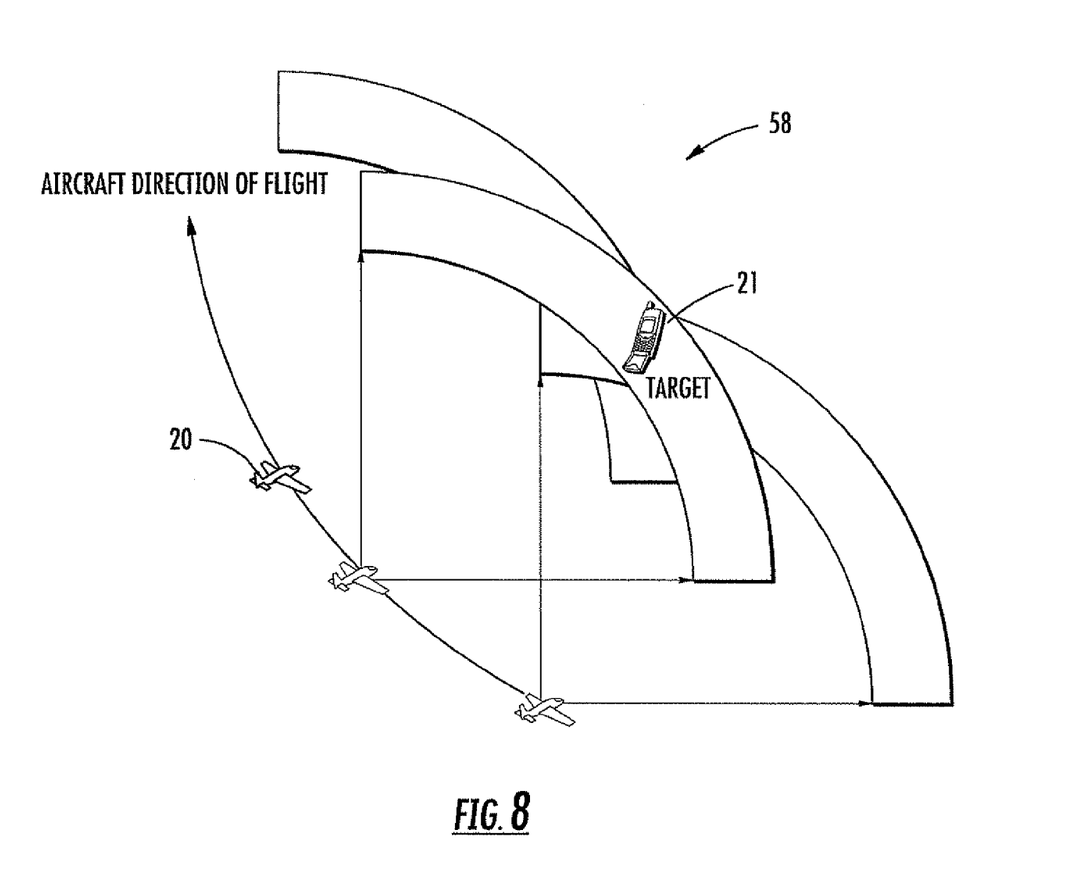
FIG. 8 is a schematic diagram of the location determining system, according to the present invention, receiving signals from the wireless transmitter.

As the platform 20 moves relative to the wireless transmitter 21, this motion is shown in the diagram 58 of FIG. 8, the location determining processor 23 generates a series of range-bearings equations. As discussed above, each range-bearing equation is based upon at least the range measurements and the received signal measurements but may also include the AOA measurements and the received signal strength measurements. The range-bearing equations may be solved to provide an estimated location of the wireless transmitter 21. As will be appreciated by those skilled in the art, the time elapsed between generation of each range-bearing equation is based upon platform 20 velocity and the type of platform.

Figure 4:
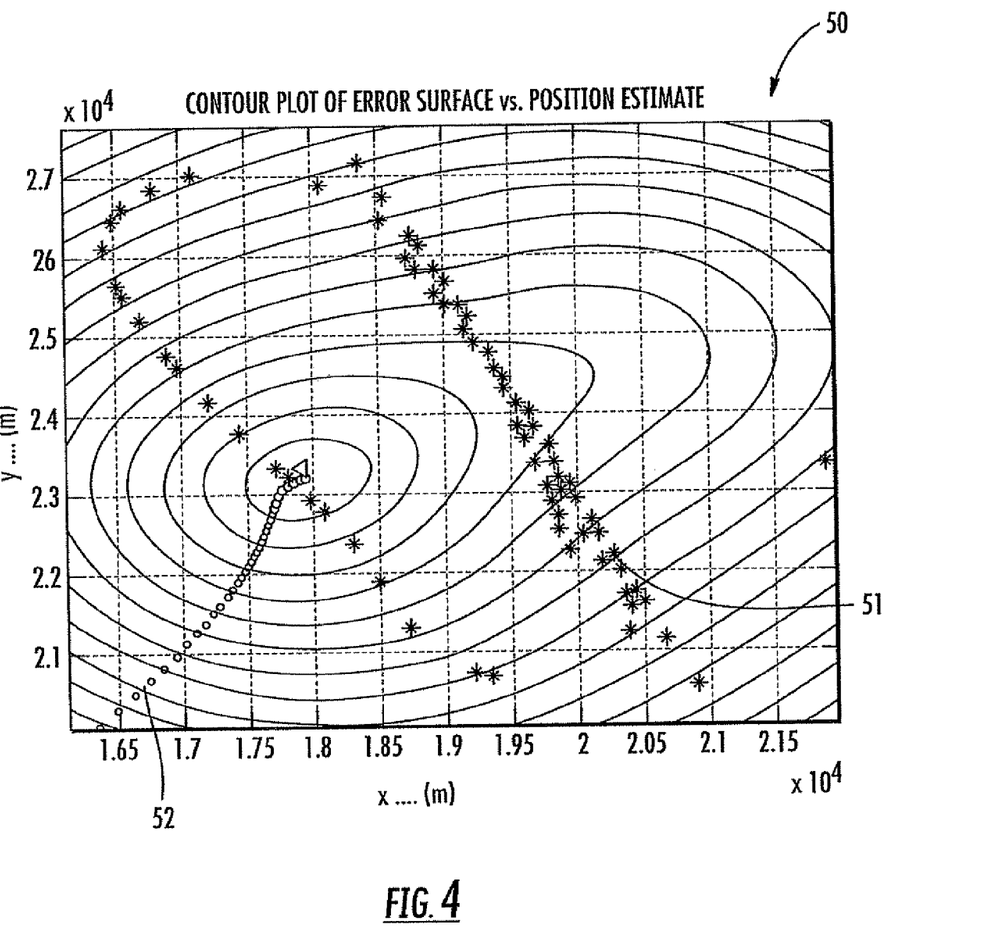
FIG. 4 is a contour plot of an error surface for a test run of the location determining system, according to the present invention.
Figure 7:
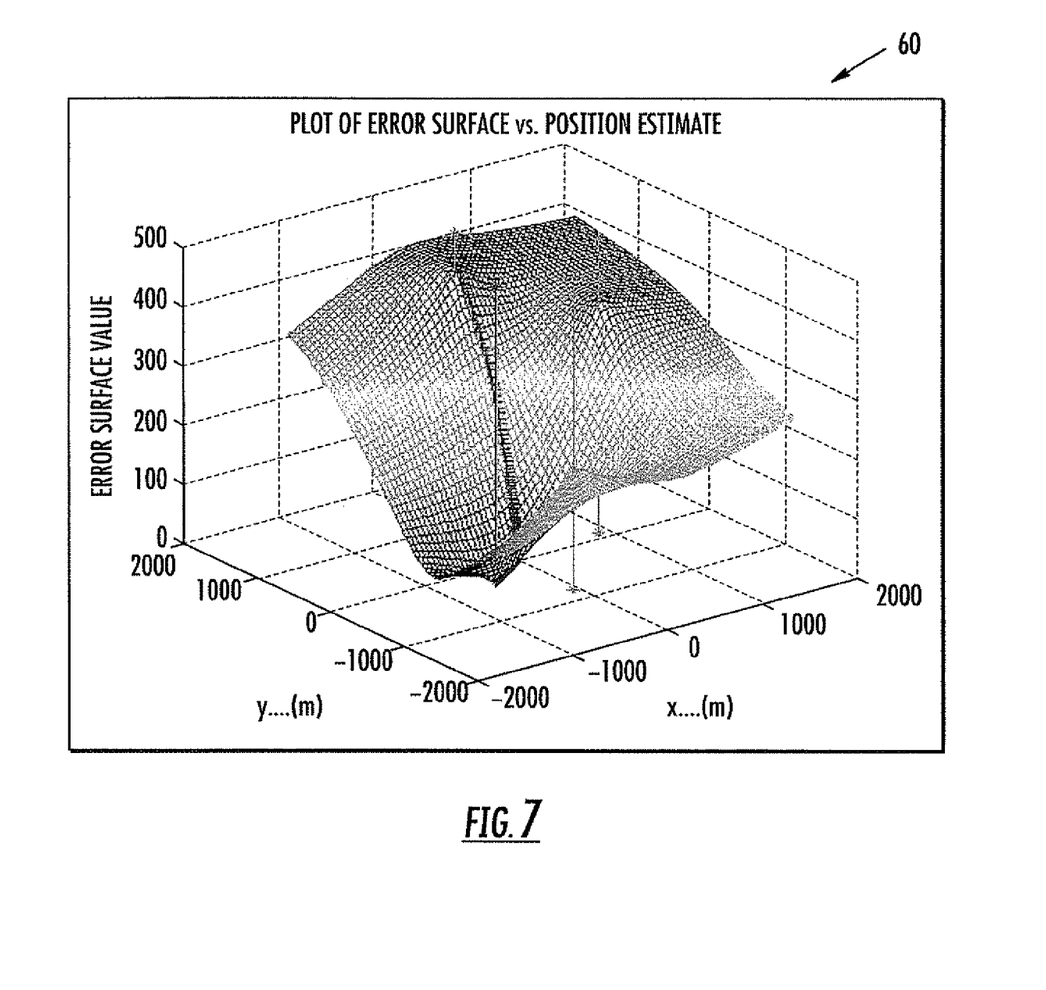
FIG. 7 is an exemplary three-dimensional contour plot of an error surface for the location determining system, according to the present invention.

Referring briefly to FIG. 4, a contour plot 50 of an error surface for a test run of the location determining system 22 is illustrated. The light grey star points 51 represent the position of the platform 20 as it moves relative to the wireless transmitter 21. The dark grey points 52 represent the iterative, estimated solutions of the series of range-bearing equations, the points moving toward the actual location of the wireless transmitter 21 as they become more accurate. The contour plot of the error surface provides an approximate error of the estimated location of the wireless transmitter 21 based upon the locations of the platform 20. The contour plot 50 may assist a user of the platform 20 (for example, aircraft or ground vehicle) in determining the distribution of errors based upon the geometry, therefore allowing for the optimization of the ground search for the wireless transmitter 21. As will be appreciated by those skilled in the art, FIG. 7 includes an exemplary three-dimensional error contour plot 60.

Referring again to FIG. 1, the location determining processor 23 may estimate the location of the wireless transmitter 21 based upon the range measurements, the angle of arrival measurements, and the received signal strength measurements weighted by the received signal measurements, for example, at least one of bit-error rate measurements, received signal strength measurements, receiver metrics, and signal-to-noise ratio measurements. More specifically, when the received signal measurement indicates a high quality received signal, for example, when the signal-to-noise ratio value is larger, the location determining processor 23 interprets the other associated signal measurements (range measurements, AOA measurements, received signal strength measurements) relevant to the estimation of the wireless transmitter's 21 location to be of a higher quality, and therefore those measurements are more heavily weighted among the total set of measurements relevant to produce the location estimate.

As will be appreciated by those skilled in the art, the accuracy of the location estimate of the wireless transmitter 21, which is based upon the range measurements, the AOA measurements, and the received signal strength measurements, varies based upon the overall geometry of the situation. As the platform 20 moves relative to the wireless transmitter 21, the accuracy of the location estimate improves if the trajectory of the platform: breaks symmetry with regards to the wireless transmitter, reduces ambiguity resolution, and minimizes geometric dilution of precision (GDOP).

Hence, as the platform 20 moves relative to the wireless transmitter 21 and generates a series of range-bearing equations, the location determining processor 23 may give greater weight to range-bearing equations that correspond to positions with received signal measurements indicating a greater quality level. Moreover, the weighting between the range measurements, the received signal strength measurements, and the AOA measurements may be based upon a predetermined ratio that is based upon at least past experimental results.

Figure 5:
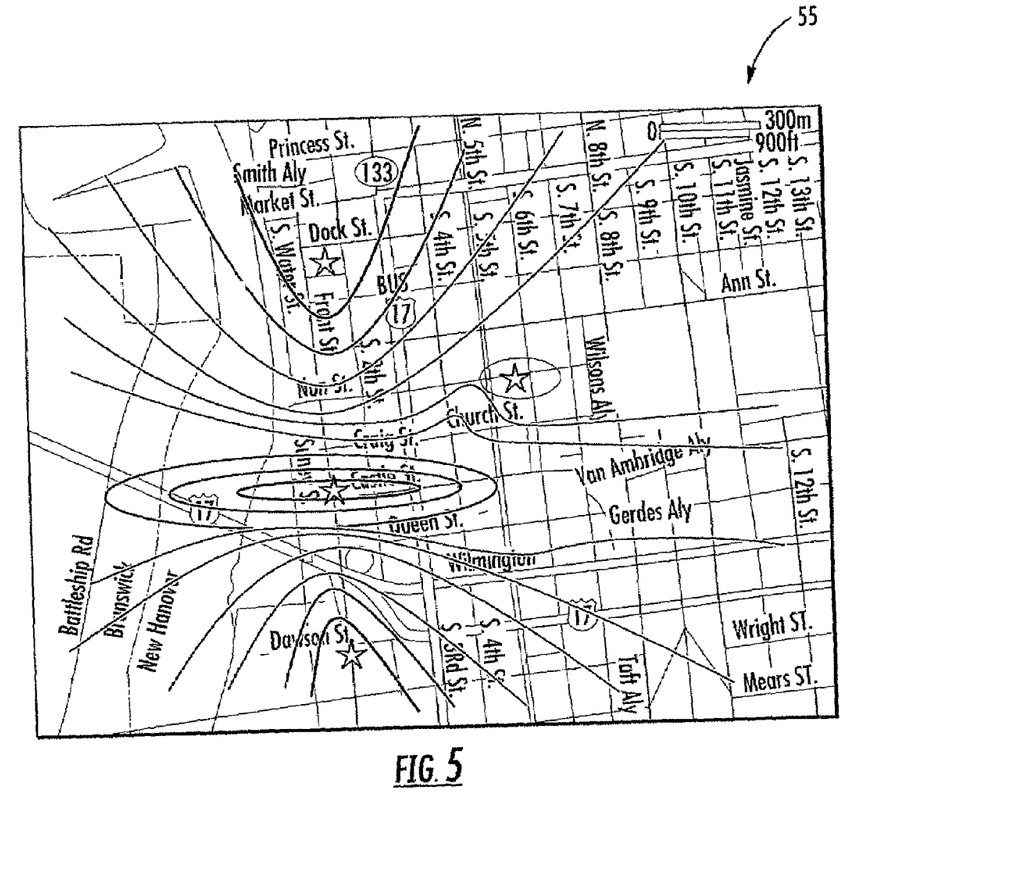
FIG. 5 is an exemplary contour plot of an error surface for the location determining system, according to the present invention, superimposed on a map of the geographical terrain.

The location determining system 22 illustratively includes a platform position determining device 26, for example, a Global Positioning System (GPS) receiver. The platform position determining device 26 provides the location determining system 22 with a current geographic location of the platform 20. The location determining processor 23 cooperates with the platform position determining device 26 so that the estimated location of the wireless transmitter 21 comprises an estimated geolocation. In other words, the location determining system 22 provides the estimated longitude and latitude of the wireless transmitter 21. Additionally, the location determining processor 23 estimates an elevation of the wireless transmitter 21, i.e. the altitude of the wireless transmitter. Advantageously, the error contour plot for the estimated location of the wireless transmitter 21 may be superimposed over a map 55 for advantageous reliability and search, example shown in FIG. 5.

Figure 2:
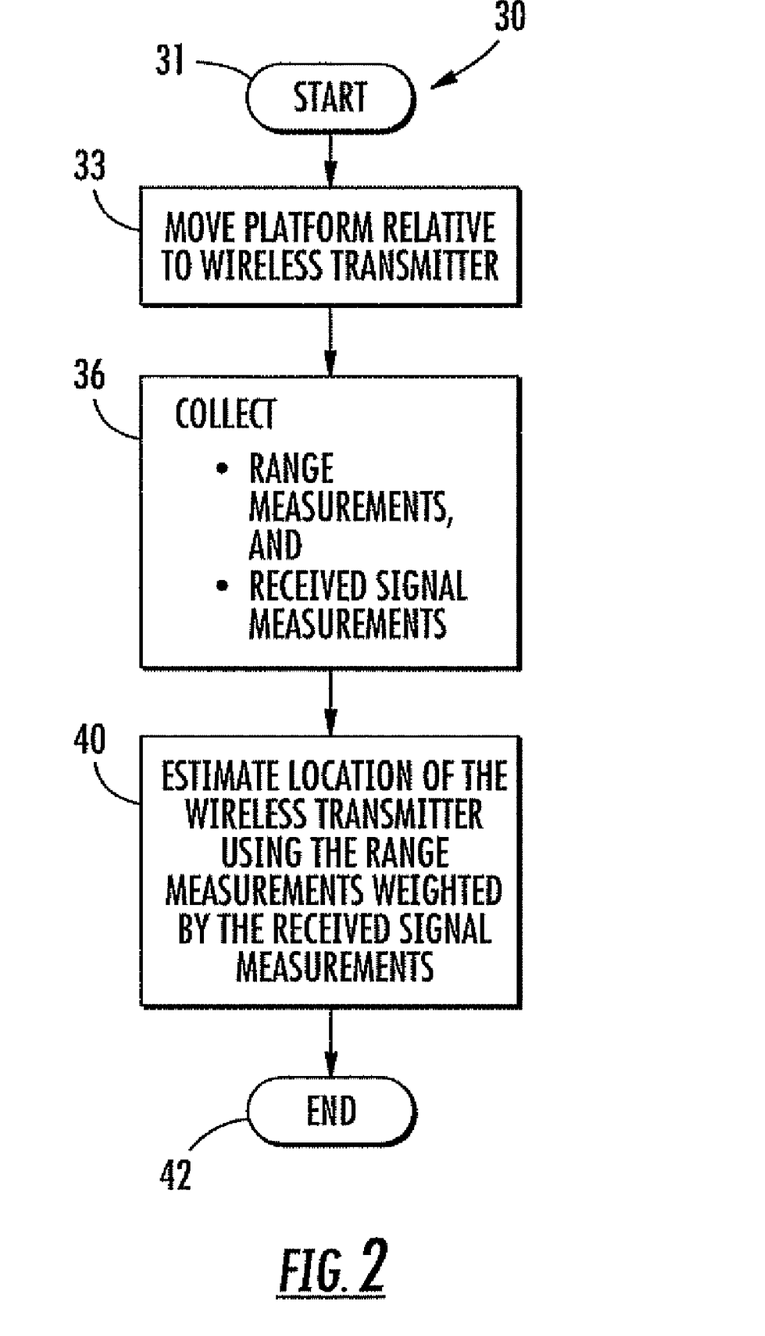
FIG. 2 is a flowchart illustrating a method of estimating a location of a wireless transmitter using the location determining system, according to the present invention.

Referring now both to FIGS. 1 and 2, a flowchart 30 illustrates a method of estimating a location of a wireless transmitter 21 using a location determining system 22. At Block 31, the method begins and illustratively includes moving at Block 33 the platform relative to the wireless transmitter 21. As will be appreciated by those skilled in the art, it may be preferable to encircle the approximate location of the wireless transmitter 21 to provide more accurate results, i.e. breaking the symmetry.

The method illustratively includes at Block 36 collecting, during movement of the location determining system 22 relative to the wireless transmitter 21, a series of range measurements and a corresponding series of received signal measurements. The method also illustratively includes estimating at Block 40 a location of the wireless transmitter 21 based upon the range measurements weighted using the received signal measurements, ending at Block 42.

Figure 3:
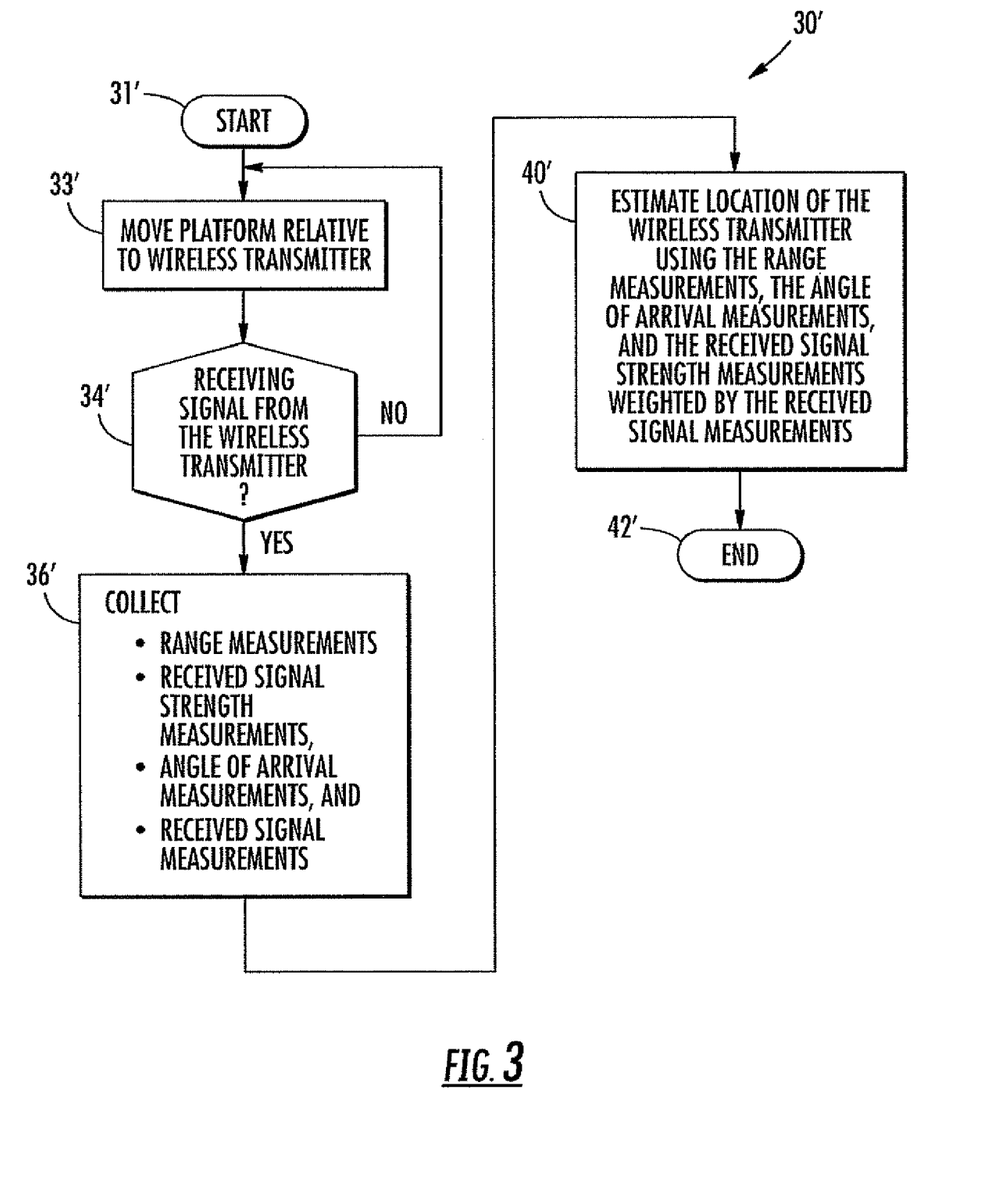
FIG. 3 is a more detailed flowchart of the method of estimating a location of a wireless transmitter using the location determining system, according to the present invention.

Referring now additionally to FIG. 3, another embodiment of the method is now described. In this embodiment of the method, those elements already discussed above with respect to FIG. 2 are given prime notation and most require no further discussion herein. This embodiment differs from the previous embodiment in that the method further comprises a decision Block 34' for determining whether a transmission signal is received from the wireless transmitter 21. If no signal is received, the method returns to Block 33' and continues to move the platform 20 until the transmission signal is received. If the transmission signal is received, the method moves on to Block 36' for collection of measurements. In this embodiment, at Block 36', the method further includes collecting corresponding angle of arrival measurements and corresponding received signal strength measurements. Moreover, at Block 40', the method further includes using angle of arrival measurements and received signal strength measurements weighted by the received signal measurements to estimate the location of the wireless transmitter 21. The method ends at Block 42'.

The location determining processor 23 estimates the location of the wireless transmitter 21 based upon a least-squares steepest decent algorithm. As will be appreciated by those skilled in the art, a detailed exemplary implementation of the mathematical algorithm used by the location determining system 22 of FIG. 1 follows.

The mathematical algorithm includes a Non-Linear Least Squares Steepest Descent Algorithm (NLSSDA) in a full 3D geolocation context using a variety of families of range equations. The algorithm may be applicable for ground level, elevated, or airborne sensors (or a combination thereof). The algorithm may function with a number of networked ground based sensors or a single mobile sensor (ground based or airborne) to accomplish target location estimation. The algorithm, itself rather decoupled from the specific measurement techniques, also works for a broad range of wireless signals, including GSM, IS-95, cdma2000, and UMTS, for example.

Section 1: Introduction

The following description derives and presents the relevant mathematics that apply to the 3D geolocation problem. Note that the various range equations and cost functions derived herein can be weighted and combined into the same adaptive algorithm, providing a viable data fusion technique to incorporate various families of data useful for the location estimation problem. Indeed, the algorithm may allow for the various measurements and families of measurements to be weighted relative to each other, such that, location estimate is optimized in a weighted least-squares sense.

The equations below are derived for the general case where the target is located in a 3D space, which may be useful if the target (wireless transmitter 21) is in a high-rise building, in a mountainous region, or some similar situation. As will be appreciated by those skilled in the art, the specific case where the target is confined to ground level (i.e. z=0) is a special case and is readily dealt with using the more general equations. The specific coordinate system used is not relevant, and the algorithm has been demonstrated to operate quite effectively in an earth-centered-earth-fixed (ECEF) 3D coordinate system, for example. As will be appreciated by those skilled in the art, other coordinate systems may be used.

Section 2: Time of Flight Based Approach

The primary geolocation method is referred to as the time of flight (TOF) method. The following measurement cost function can be defined for the TOF method:

$$f_i(x) = \sqrt{(x_i - x)^2 + (y_i - y)^2 + (z_i - z)^2} - \frac{c\Delta t_i}{2}, \quad (1)$$

where $$\Delta t_i = T^i_{elapse} - 3 \cdot T_{slots} + TA, \quad (2)$$

and $$x = [x_0 y_0 z_0]^T.$$

As will be appreciated by those skilled in the art, equation (2) relates specifically to the GSM standard and may be modified to comply with other wireless standards. The terms in equation (2) are either known or measured, and the remaining terms in (1) depend only on the current positions of the sensor and the target estimate. In one embodiment, $\Delta t_i$=TA and location estimation is based on the reported timing advance (TA). In equations (1) and (2), the measurements are taken with the sensor (antenna 25) at position i, and the unknown target position at position x. The following overall cost function can be defined over a set of measurements i∈[1 ... N].

$$F(x) = \sum_{i=1}^{N} \alpha_i^2 f_i^2(x) \quad (3)$$

In equation (3), the $\alpha_i$ is a weighting term and can be set to establish the relative importance and/or quality of the measurements. This is the term that may be related to the signal quality estimate. The position estimate of the target can be updated according to the equation $$x_{k+1} = x_k - U \nabla_x F(x_k), \quad (4)$$

where U is a diagonal matrix, where the algorithm convergence properties are controlled by the values of the diagonal elements, and $$\nabla_x F(x_k) = \nabla_x F(x)|_{x_k} = \begin{pmatrix} \frac{\delta F}{\delta x}\big|_{x_k} \\ \frac{\delta F}{\delta y}\big|_{y_k} \\ \frac{\delta F}{\delta z}\big|_{z_k} \end{pmatrix}. \quad (5)$$

It follows that the partial derivatives may be derived, which are used in equation (5). This may be done in the following development.

Let $u_i = (x_i - x)^2 + (y_i - y)^2 + (z_i - z)^2$, then rewrite formula (I) as $$f_i(x) = \sqrt{u_i} - \frac{c\Delta t_i}{2}. \quad (6)$$

Now using differential Calculus, the partial derivative of the overall cost function in formula (3) is $$\frac{\delta F}{\delta x} = 2 \cdot \sum_{i=1}^{n} \alpha_i^2 f_i(x) \cdot \frac{\delta f_i(x)}{\delta x}, \text{ where} \quad (7)$$

$$\frac{\delta f_i(x)}{\delta x} = \frac{1}{2\sqrt{u_i}} \cdot \frac{\delta u_i}{\delta x} \tag{8}$$

$$= \frac{1}{2\sqrt{u_i}} \cdot 2(x_i - x) \cdot (-1)$$

$$= \frac{(x - x_i)}{\sqrt{(x_i - x)^2 + (y_i - y)^2 + (z_i - z)^2}}.$$

The final form of the equation may be written as $$\frac{\delta F}{\delta x}\bigg|_{x_k} = 2 \cdot \sum_{i=1}^{N} a_i^2 f_i(x) \cdot \frac{(x_k - x_i)}{\sqrt{(x_i - x_k)^2 + (y_i - y_k)^2 + (z_i - z_k)^2}}. \tag{9}$$

In like fashion, the other partial derivatives functions can be derived and are summarized below.

$$\frac{\delta F}{\delta y}\bigg|_{y_k} = 2 \cdot \sum_{i=1}^{N} a_i^2 f_i(x) \cdot \frac{(y_k - y_i)}{\sqrt{(x_i - x_k)^2 + (y_i - y_k)^2 + (z_i - z_k)^2}} \tag{10}$$

$$\frac{\delta F}{\delta z}\bigg|_{z_k} = 2 \cdot \sum_{i=1}^{N} a_i^2 f_i(x) \cdot \frac{(z_k - z_i)}{\sqrt{(x_i - x_k)^2 + (y_i - y_k)^2 + (z_i - z_k)^2}} \tag{11}$$

In summary, the NLSSDA for the TOF method is described by equations (4), (5), and (9)-(11).

Section 3: Received Signal Strength Indication Based Approach

This section derives the equations that use signal power measurements at multiple locations as a way to gain location information of the target. The derivation of the equations is included below in summary form. The measured target signal power at two locations can be used to write the following equations, where a is the path loss exponent, $P_{RX}$ is the measured signal power, and $r_x$ is the range.

$$r_2/r_1 = (P_{r1}/P_{r2})^{1/a} \tag{12}$$

$$(r_2/r_1)^a = (P_{r1}/P_{r2}) \tag{13}$$

$$(r_1/r_2)^a = (P_{r2}/P_{r1}) \tag{14}$$

$$(r_i/r_{i+1})^a = (P_{i+1}/P_i) \tag{15}$$

Now, after taking the log of both sides of (15), and expressing the ranges in terms of the relevant x, y, z coordinates, the following cost function is provided.

$$g_i(x) = \frac{P_{i+1}}{P_i} - \left\{ \frac{\sqrt{(x_i - x)^2 + (y_i - y)^2 + (z_i - z)^2}}{\sqrt{(x_{i+1} - x)^2 + (y_{i+1} - y)^2 + (z_{i+1} - z)^2}} \right\}^a. \tag{16}$$

The relevant measurement cost function is expressed as $$f_{RSSI}^i(x) = \log_{10} g_i(x) \tag{17}$$

$$= P_{i+1}(dB) - P_i(dB) - a \left\{ \log_{10} \sqrt{\frac{(x_i - x)^2 + (y_i - y)^2 +}{(z_i - z)^2}} - \log_{10} \sqrt{\frac{(x_{i+1} - x)^2 + (y_{i+1} - y)^2 +}{(z_{i+1} - z)^2}} \right\}$$

where again, $x = [x_0 y_0 z_0]^T$ is the current estimated position of the target.

The overall cost function is as described in equation (3), where $f_i(x)$ is replaced with $f_{RSSI}^i(x)$. The derivation of the partial derivatives for the measurement cost function in equation (17) makes use of the following form:

$$\frac{d}{dx} \log_a u = \log_a e \cdot \frac{1}{u} \cdot \frac{du}{dx}. \tag{18}$$

Applying equation (18) to equation (17), consider the following development. Let $u_i = (x_i - x)^2 + (y_i - y)^2 + (z_i - z)^2$, it can then be written as:

$$\frac{\delta f_{RSSI}^i(x)}{\delta x} = -a \left\{ \begin{array}{l} \log_{10} e \cdot \frac{1}{\sqrt{u_i}} \cdot \frac{1}{2\sqrt{u_i}} \cdot 2(x_i - x) \cdot (-1) - \\ \log_{10} e \cdot \frac{1}{\sqrt{u_{i+1}}} \cdot \frac{1}{2\sqrt{u_{i+1}}} \cdot 2(x_{i+1} - x) \cdot (-1) \end{array} \right\} \tag{19}$$

$$\frac{\delta f_{RSSI}^i(x)}{\delta x} = -a \cdot \log_{10} e \cdot \left\{ \frac{(x - x_i)}{u_i} - \frac{(x - x_{i+1})}{u_{i+1}} \right\} \tag{20}$$

$$\frac{\delta f_{RSSI}^i(x)}{\delta y} = -a \cdot \log_{10} e \cdot \left\{ \frac{(y - y_i)}{u_i} - \frac{(y - y_{i+1})}{u_{i+1}} \right\} \tag{21}$$

$$\frac{\delta f_{RSSI}^i(x)}{\delta z} = -a \cdot \log_{10} e \cdot \left\{ \frac{(z - z_i)}{u_i} - \frac{(z - z_{i+1})}{u_{i+1}} \right\}. \tag{22}$$

Now using differential Calculus, the partial derivative of the overall cost function in equation (3) can be written as (recall general development in section 2):

$$\frac{\delta F}{\delta x}\bigg|_{x_k} = 2 \cdot \sum_{i=1}^{N} a_i^2 f_{RSSI}^i(x) \cdot \left( -a \cdot \log_{10} e \cdot \left\{ \frac{(x_k - x_i)}{u_i} - \frac{(x_k - x_{i+1})}{u_{i+1}} \right\} \right) \tag{23}$$

$$\frac{\delta F}{\delta y}\bigg|_{y_k} = 2 \cdot \sum_{i=1}^{N} a_i^2 f_{RSSI}^i(x) \cdot \left( -a \cdot \log_{10} e \cdot \left\{ \frac{(y_k - y_i)}{u_i} - \frac{(y_k - y_{i+1})}{u_{i+1}} \right\} \right) \tag{24}$$

$$\frac{\delta F}{\delta z}\bigg|_{z_k} = 2 \cdot \sum_{i=1}^{N} a_i^2 f_{RSSI}^i(x) \cdot \left( -a \cdot \log_{10} e \cdot \left\{ \frac{(z_k - z_i)}{u_i} - \frac{(z_k - z_{i+1})}{u_{i+1}} \right\} \right). \tag{25}$$

In summary, the NLSSDA for the relative received signal strength indication (RSSI) method is described by equations (4), (5), and (23)-(25).

Figure 9:
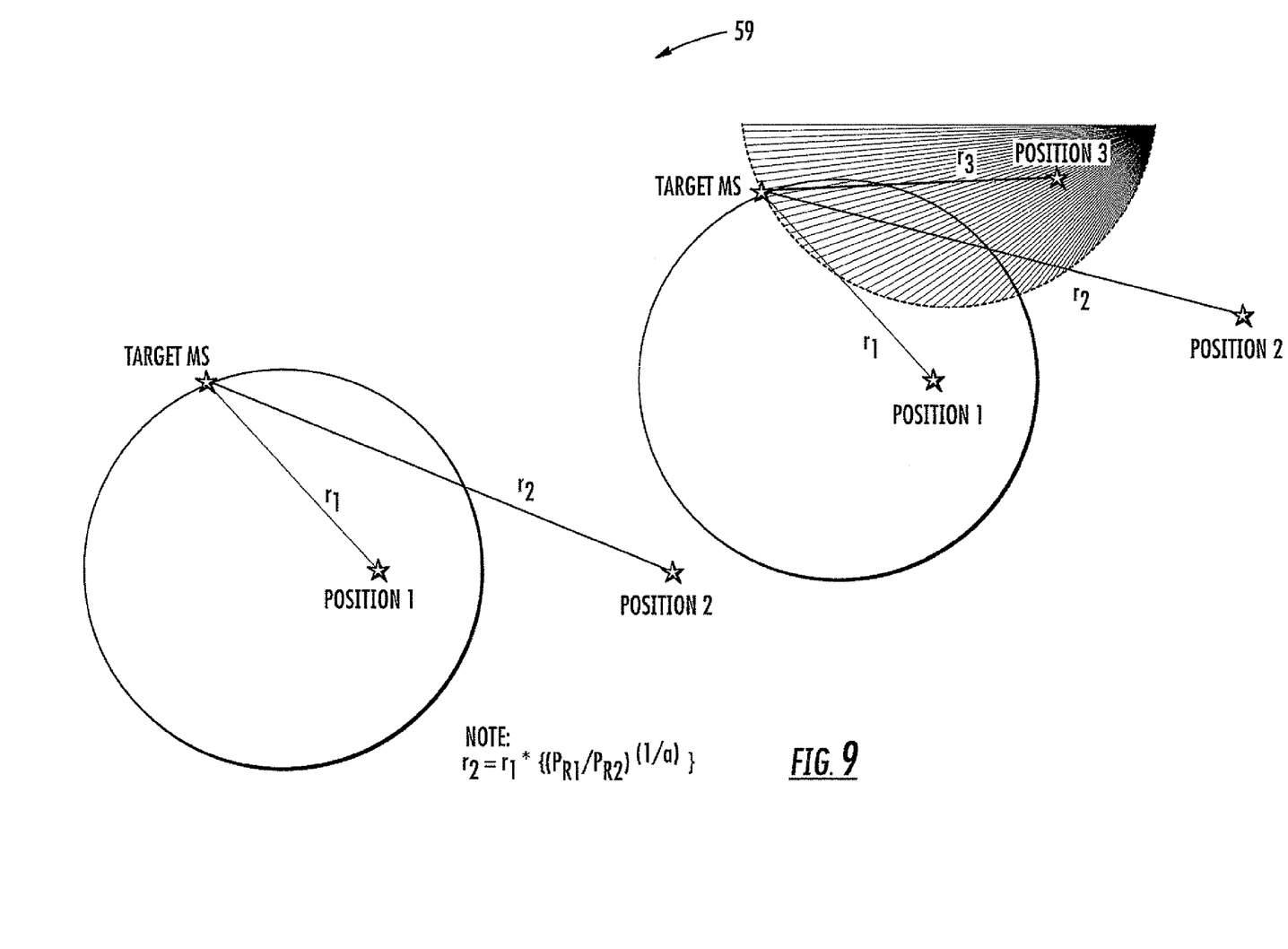
FIG. 9 is a schematic diagram of the location determining system, according to the present invention, estimating the location of the wireless transmitter.
Figure 10:
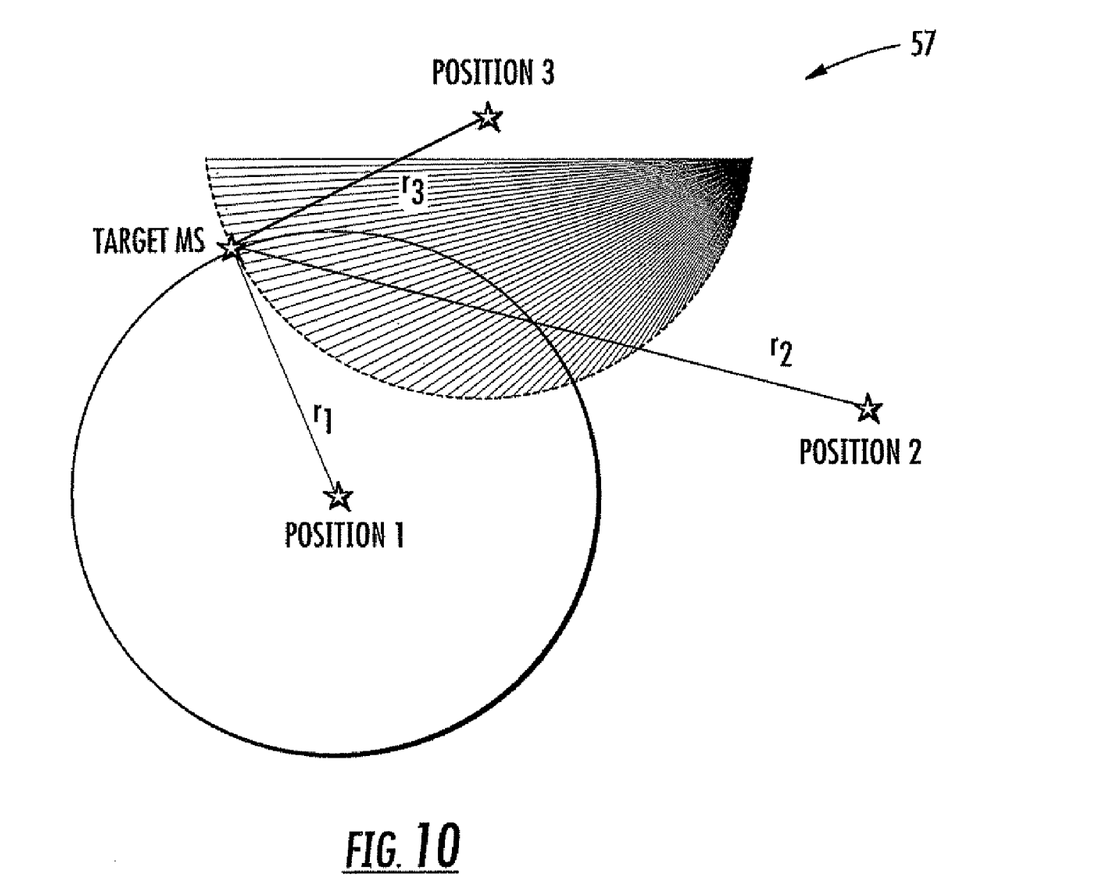
FIG. 10 is a second schematic diagram of the location determining system, according to the present invention, estimating the location of the wireless transmitter.

Referring to FIGS. 9-10, charts 57, 59 illustrate takings of the received signal strength measurements at N points, each pair of measurements may permit the construction of a circle. The target location is estimated as the intersection of the circles.

Section 4: Angle of Arrival Approach

This section derives the equations that use any AOA measurements that may be available at multiple locations as a way to gain location information of the target. These AOA measurements may be made, for example, with the aid of a switched beam antenna 25. In like fashion, the other partial derivative functions can be derived and are summarized below.

This method is derived for 3D space, however, this may be optimal only if the antenna is highly directional in terms of azimuth and elevation. Indeed, practical antennas are most likely not highly directional in either orientation, however, even low resolution directivity information (used with low weights in the algorithm) may be useful for ambiguity resolution and breaking symmetry in the overall error surface. In the 3D case, it is assumed that the antenna is somewhat directional in terms of azimuth and elevation. The 2D case for antenna directivity may allow azimuth to be easily derived from the equations as a special case.

The derivation of the equations is included below in summary form. The sensor at each position i determines an estimated azimuth and elevation angle to the target. All angles are processed with knowledge of each sensor's measurement position and orientation so that the angles can be converted to a set of linear equations in the relevant 3D Cartesian coordinate system. There will be an equation for each sensor angle measurement. The final set of equations can be written as follows for each sensor i:

$$h_i(x) = z = m_i x + n_i y + b_i. \quad (26)$$

The relevant measurement cost function is expressed as $$f_{ANG}{}^i(x) = m_i x + n_i y + b_i - z, \quad (27)$$

where again $x = [x_0 y_0 z_0]^T$ is the current estimated position of the target.

The overall cost function is as described in equation (3), where $f_i(x)$ is replaced with $f_{ANG}{}^i(x)$. The partial derivatives for the measurement cost function in equation (27) are easily established as:

$$\frac{\delta f_{ANG}^i(x)}{\delta x} = m_i \quad (28)$$

$$\frac{\delta f_{ANG}^i(x)}{\delta y} = n_i \quad (29)$$

$$\frac{\delta f_{ANG}^i(x)}{\delta z} = -1. \quad (30)$$

Now using differential Calculus, the partial derivative of the overall cost function in equation (3) can be written as (recall general development in section 2):

$$\left.\frac{\delta F}{\delta x}\right|_{x_k} = 2 \cdot \sum_{i=1}^{N} \alpha_i^2 f_{ANG}^i(x) \cdot m_i \quad (31)$$

$$\left.\frac{\delta F}{\delta y}\right|_{y_k} = 2 \cdot \sum_{i=1}^{N} \alpha_i^2 f_{ANG}^i(x) \cdot n_i \quad (32)$$

$$\left.\frac{\delta F}{\delta z}\right|_{z_k} = 2 \cdot \sum_{i=1}^{N} \alpha_i^2 f_{ANG}^i(x) \cdot (-1). \quad (33)$$

In summary, the NLSSDA for the relative RSSI method is described by equations (4), (5), and (31)-(33).

Section 5: Synchronized TDOA Approach

For completeness, an embodiment using the synchronized TDOA approach is also discussed herein, which is applicable for a set of time synchronized sensors. This section derives the synchronized TDOA equations, which use measurements at multiple locations as a way to gain location information of the target. Assuming that the target is located at position $(x_0, y_0, z_0)$, and transmits at time $\tau_0$. Assuming that there are N time synchronized sensors deployed at positions $(x_1, y_1, z_1), \ldots, (x_N, y_N, z_N)$, and that they receive the transmission from target mobile at times $\tau_1, \ldots, \tau_N$. For sensor $i \in 1 \ldots N$, the following cost function may be derived:

$$f_{TDOA}^i(x) = \sqrt{(x_i - x)^2 + (y_i - y)^2 + (z_i - z)^2} - c(\tau_i - \tau), \quad (34)$$

where c is the speed of light, and $x = [x \; y \; z \; \tau]^T$ is the unknown vector which contains the current estimated position of the target and the estimated target transmission time. This function takes on a low value ideally (and in the absence of all error sources) at all sensors when $x = [x_0 y_0 y_0 \tau_0]^T$.

The cost function specific to the hyperbolic based synchronized TDOA is derived as follows:

$$f_{TDOA}^i(x) - f_{TDOA}^{i+1}(x) = \sqrt{(x_i - x)^2 + (y_i - y)^2 + (z_i - z)^2} - \sqrt{(x_{i+1} - x)^2 + (y_{i+1} - y)^2 + (z_{i+1} - z)^2} - c(\tau_i - \tau) + c(\tau_{i+1} - \tau) \quad (35)$$

$$f_{TDOA}^i(x) - f_{TDOA}^{i+1}(x) = \sqrt{(x_i - x)^2 + (y_i - y)^2 + (z_i - z)^2} - \sqrt{(x_{i+1} - x)^2 + (y_{i+1} - y)^2 + (z_{i+1} - z)^2} - c(\tau_i - \tau_{i+1}) \quad (36)$$

$$f_{HYP}^i(x) = f_{TDOA}^i(x) - f_{TDOA}^{i+1}(x), \text{ where } x = (x_0, y_0, z_0)^T. \quad (37)$$

The cost function may be dependent only on the measured time difference of arrival between relevant sensors and the position of the target. Given a perfect measurement in ideal conditions, this cost function approaches zero as the estimate approaches the actual target location. The estimate vector in this case is free of the unknown target transmit time, as this has been subtracted out and is of no practical interest for the location estimation application. The remainder of the development for the hyperbolic case follows that presented in section 2 above.

The overall cost function is as described in equation (3), where $f_i(x)$ is replaced with $f_{HYP}^i(x)$. The relevant partial derivatives of $f_{HYP}^i(x)$ are determined as shown below. Let $u_i = (x_i - x)^2 + (y_i - y)^2 + (z_i - z)^2$, then rewrite the cost function in equation (37) as:

$$f_{HYP}^i(x) = \sqrt{u_i^2} - \sqrt{u_{i+1}^2} - c(\tau_i - \tau_{i+1}). \quad (38)$$

Now using differential Calculus, the partial derivative of the cost function in equation (38) is $$\frac{\delta f_{HYP}^i(x)}{\delta x} = \frac{1}{2\sqrt{u_i}} \cdot \frac{\delta u_i}{\delta x} - \frac{1}{2\sqrt{u_{i+1}}} \cdot \frac{\delta u_{i+1}}{\delta x} \quad (39)$$

$$= \frac{1}{2\sqrt{u_i}} \cdot 2(x_i - x) \cdot (-1) - \frac{1}{2\sqrt{u_{i+1}}} \cdot$$

-continued $$= \frac{2(x_{i+1}-x)\cdot(-1)}{\sqrt{(x_i-x)^2+(y_i-y)^2+(z_i-z)^2}} -$$

$$\frac{(x-x_{i+1})}{\sqrt{(x_{i+1}-x)^2+(y_{i+1}-y)^2+(z_{i+1}-z)^2}},$$

so the final form of the partial derivatives of the system level cost function can be rewritten as:

$$\left.\frac{\delta F}{\delta x}\right|_{x_k} = \quad (40)$$

$$2\cdot \sum_{i=1}^{N} \alpha_i^2 f_{HYP}^i(x)\cdot \left\{ \frac{(x_k-x_i)}{\sqrt{(x_i-x_k)^2+(y_i-y_k)^2+(z_i-z_k)^2}} - \frac{(x_k-x_{i+1})}{\sqrt{(x_{i+1}-x_k)^2+(y_{i+1}-y_k)^2+(z_{i+1}-z_k)^2}} \right\}.$$

In like fashion, the other partial derivatives functions can be derived and are summarized below.

$$\left.\frac{\delta F}{\delta y}\right|_{y_k} = \quad (41)$$

$$2\cdot \sum_{i=1}^{N} \alpha_i^2 f_{HYP}^i(x)\cdot \left\{ \frac{(y_k-y_i)}{\sqrt{(x_i-x_k)^2+(y_i-y_k)^2+(z_i-z_k)^2}} - \frac{(y_k-y_{i+1})}{\sqrt{(x_{i+1}-x_k)^2+(y_{i+1}-y_k)^2+(z_{i+1}-z_k)^2}} \right\}$$

$$\left.\frac{\delta F}{\delta z}\right|_{z_k} = \quad (42)$$

$$2\cdot \sum_{i=1}^{N} \alpha_i^2 f_{HYP}^i(x)\cdot \left\{ \frac{(z_k-z_i)}{\sqrt{(x_i-x_k)^2+(y_i-y_k)^2+(z_i-z_k)^2}} - \frac{(z_k-z_{i+1})}{\sqrt{(x_{i+1}-x_k)^2+(y_{i+1}-y_k)^2+(z_{i+1}-z_k)^2}} \right\}$$

Compare these equations to equations (9)-(11), respectively. In summary, the NLSSDA for the TDOA method is described by equations (4), (5), and (40)-(42).

Section 6: Data Fusion Across Measurement Families

The various measurements and equations derived in previous sections can be combined and used simultaneously in the same algorithm (i.e., data fusion). In this case, the adaptive algorithm combines the various measurements, and families of measurements, in a weighted least-squares sense. Assuming that there are N sensor measurements, there are N equations for methods that are not differential in nature (i.e., TOF and AOA methods), and M equations for methods that are differential in nature (i.e., relative RSSI method, and TDOA).

If imposing a restriction that utilizes only independent sensor combinations, then M=N−1. It has been established (via simulations) that with noise and all other error sources enabled, using all of the dependent combinations in addition to the independent combinations affords better performance as a result of averaging the noise and errors components. In the case where all combinations of sensors are used, M=1+2+ . . . +N−1, there are $N_{RSSI}$=M RSSI based equations, $N_{HYP}$=M TDOA based equations, $N_{TOF}$=N TOF based equations, and $N_{ANG}$=N AOA based equations. The equations discussed in the previous sections are combined to form the overall cost function as follows:

$$F_{COM}(x) = \sum_{i=1}^{N_{TOF}} \alpha_i^2 f_i^2(x) + \sum_{i=1}^{N_{RSSI}} \alpha_{RSSI,i}^2 f_{RSSI,i}^2(x) + \quad (34)$$

$$\sum_{i=1}^{N_{ANG}} \alpha_{ANG,i}^2 f_{ANG,i}^2(x) + \sum_{i=1}^{N_{HYP}} \alpha_{HYP,i}^2 f_{HYP,i}^2(x)$$

The relevant partial derivatives of this function are easily determined using the property that the derivative of a sum of terms is the sum of the derivatives of the terms and using equations (9)-(11), (23)-(25), (31)-(33), and (40)-(42), which have been previously derived. As usual, the position estimate of the target is updated according to the following equation:

$$x_{k+1} = x_k - \mu \nabla_x F_{COM}(x_k), \quad (35)$$

where $$\nabla_x F_{COM}(x_k) = \nabla_x F_{COM}(x)|_{x_k}$$

$$= \begin{pmatrix} \left.\frac{\delta F_{COM}}{\delta x}\right|_{x_k} \\ \left.\frac{\delta F_{COM}}{\delta y}\right|_{y_k} \\ \left.\frac{\delta F_{COM}}{\delta z}\right|_{z_k} \end{pmatrix}.$$

Using this strategy, by judiciously choosing the $\alpha_i$ terms in (34), different families of measurements, indeed even measurements within families, can be combined in a weighted sense (including turning off by setting the relevant weights to 0) to arrive at a position estimate that is optimized in a weighted least-squares sense. In summary, the NLSSDA for this hybrid approach is described by equations (34), (35), and using the partial derivative terms in (9)-(11), (23)-(25), (31)-(33), and (40)-(42) in the computation of (35).

Section 7: Conclusion

Provided herein is the relevant mathematics used for full 3D geolocation using a variety of measurement families. In addition to providing a range of techniques for location estimation, this technique offers the ability to combine all of the various measurement families into a single algorithm so that a location estimate is computed which is optimum in a weighted least squared sense. The weighting is completely general. Individual measurements can be weighted relative to its peer's measurements, or entire measurement families can be weighted relative to other families of measurements.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A location determining system for a wireless cellular transmitter, the location determining system to be carried by a platform movable relative to the wireless cellular transmitter and comprising:

an antenna;

a receiver coupled to said antenna; and a location determining processor coupled to said receiver to collect, during movement relative to the wireless cellular transmitter, a series of range measurements, a corresponding series of received signal measurements, a corresponding series of received signal strength measurements, and to estimate a location of the wireless cellular transmitter based upon the range measurements and the received signal strength measurements, both weighted using the received signal measurements.

2. The location determining system according to claim 1 further comprising a platform position determining device; and wherein said location determining processor cooperates with said platform position determining device so that the estimated location of the wireless cellular transmitter comprises an estimated geolocation.

3. The location determining system according to claim 1 wherein said location determining processor further estimates an elevation of the wireless cellular transmitter.

4. The location determining system according to claim 1 wherein the received signal measurements comprise at least one of bit-error rate measurements, receiver metrics, and signal-to-noise ratio measurements.

5. The location determining system according to claim 1 wherein said location determining processor estimates the location of the wireless cellular transmitter based upon a least-squares steepest decent algorithm.

6. The location determining system according to claim 1 wherein said location determining processor collects the series of range measurements using time of flight measurements.

7. The location determining system according to claim 1 wherein said antenna comprises a directional antenna; wherein said location determining processor cooperates with said directional antenna to collect, during movement relative to the wireless cellular transmitter, a corresponding series of angle of arrival measurements; and wherein said location determining processor estimates the location of the wireless cellular transmitter further based upon the angle of arrival measurements.

8. The location determining system according to claim 7 wherein said location determining processor weights the angle of arrival measurements based upon the received signal measurements.

9. The location determining system according to claim 1 wherein the platform comprises an aircraft.

10. The location determining system according to claim 1 wherein the platform comprises a ground-based vehicle.

11. A location determining system for a wireless cellular transmitter, the location determining system to be carried by a platform movable relative to the wireless cellular transmitter and comprising:

a directional antenna;

a receiver coupled to said directional antenna;

a platform position determining device; and a location determining processor coupled to said receiver and said platform position determining device for collecting, during movement relative to the wireless cellular transmitter, a series of range measurements, a corresponding series of received signal measurements, a corresponding series of angle of arrival measurements, and a corresponding series of received signal strength measurements, and estimating a geolocation of the wireless cellular transmitter based upon the range measurements, the angle of arrival measurements, the received signal strength measurements, each weighted using the received signal measurements.

12. The location determining system according to claim 11 wherein the received signal measurements comprise at least one of bit-error rate measurements, receiver metrics, and signal-to-noise ratio measurements.

13. The location determining system according to claim 11 wherein said location determining processor estimates the location of the wireless cellular transmitter based upon a least-squares steepest decent algorithm.

14. The location determining system according to claim 11 wherein said location determining processor collects the series of range measurements using time of flight measurements.

15. A method of estimating a location of a wireless cellular transmitter using a location determining system, the method comprising:

collecting, during movement of the location determining system relative to the wireless cellular transmitter, a series of range measurements, a corresponding series of received signal measurements, and a corresponding series of received signal strength measurements; and estimating a location of the wireless cellular transmitter based upon the range measurements and the received signal strength measurements, both weighted using the received signal measurements.

16. The method according to claim 15 further comprising collecting, during movement of the location determining system relative to the wireless cellular transmitter, a corresponding series of angle of arrival measurements; and wherein estimating the location of the wireless cellular transmitter comprises estimating the location further based upon the angle of arrival measurements.

17. The method according to claim 15 wherein estimating the location of the wireless cellular transmitter comprises estimating a geolocation of the wireless cellular transmitter.

18. The method according to claim 15 wherein estimating the location of the wireless cellular transmitter comprises estimating an elevation of the wireless cellular transmitter.

19. The method according to claim 15 wherein the received signal measurements comprise at least one of bit-error rate measurements, receiver metrics, and signal-to-noise ratio measurements.

20. The method according to claim 15 wherein estimating the location of the wireless cellular transmitter comprises estimating the location of the wireless cellular transmitter based upon a least-squares steepest decent algorithm.

21. The method according to claim 15 wherein collecting the series of range measurements comprises collecting a series of time of flight measurements.

* * * * *